(12) United States Patent
Ueda

(10) Patent No.: US 9,758,048 B2
(45) Date of Patent: Sep. 12, 2017

(54) VEHICLE POWER-SUPPLYING SYSTEM

(71) Applicant: IHI CORPORATION, Tokyo (JP)

(72) Inventor: Akio Ueda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 14/852,795

(22) Filed: Sep. 14, 2015

(65) Prior Publication Data

US 2015/0375631 A1 Dec. 31, 2015

Related U.S. Application Data

(63) Continuation of application No. PCT/JP2013/065193, filed on May 31, 2013.

(51) Int. Cl.
*B60L 11/18* (2006.01)
*B60W 30/06* (2006.01)
(Continued)

(52) U.S. Cl.
CPC ......... *B60L 11/1835* (2013.01); *B60L 11/182* (2013.01); *B60L 11/1825* (2013.01); *B60L 11/1829* (2013.01); *B60L 11/1833* (2013.01); *B60W 30/06* (2013.01); *H02J 5/005* (2013.01); *B60L 2250/16* (2013.01);
(Continued)

(58) Field of Classification Search
CPC .............. B60L 11/1833; B60L 11/1835; B60L 11/1827; B60L 11/1829; B60L 11/1831; B62D 15/0285; Y02T 90/125; G05D 1/0234; G05D 1/0246
See application file for complete search history.

(56) References Cited

U.S. PATENT DOCUMENTS

| 4,214,266 A | * | 7/1980 | Myers | ...................... B60Q 1/22 348/118 |
| 6,999,003 B2 | | 2/2006 | Matsukawa et al. | |

(Continued)

FOREIGN PATENT DOCUMENTS

| CN | 1713099 A | 12/2005 |
| CN | 101000718 A | 7/2007 |

(Continued)

OTHER PUBLICATIONS

EPO machine translation of DE 102013207906 (original German application filed Apr. 30, 2013 and published Oct. 30, 2014).*

(Continued)

*Primary Examiner* — Behrang Badii
*Assistant Examiner* — David Testardi
(74) *Attorney, Agent, or Firm* — Volpe and Koenig, P.C.

(57) ABSTRACT

A vehicle power-supplying system that wirelessly supply power to a vehicle includes a power-supplying coil installed at a location at which the vehicle can be stopped, first and second positioning posts whose positional relationship with the power-supplying coil is fixed, a position-identifying means installed in the vehicle and configured to identify a positional relationship of the power-supplying coil with the vehicle by detecting the first and second positioning posts, and a traveling support means configured to support traveling of the vehicle to the power-supplying coil based on the positional relationship with the power-supplying coil identified by the position-identifying means.

16 Claims, 4 Drawing Sheets

(51) Int. Cl.
*H02J 5/00* (2016.01)
*H02J 7/00* (2006.01)
*H02J 7/02* (2016.01)

(52) U.S. Cl.
CPC ............ *H02J 7/0027* (2013.01); *H02J 7/025* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01)

(56) References Cited

U.S. PATENT DOCUMENTS

| | | | |
|---|---|---|---|
| 2003/0052529 A1* | 3/2003 | Hakkinen | E21C 35/24 299/1.05 |
| 2005/0285758 A1 | 12/2005 | Matsukawa et al. | |
| 2009/0040068 A1 | 2/2009 | Oyobe et al. | |
| 2010/0066515 A1* | 3/2010 | Shimazaki | B60W 50/14 340/435 |
| 2010/0161217 A1* | 6/2010 | Yamamoto | B60L 3/0046 701/408 |
| 2012/0091959 A1* | 4/2012 | Martin | B60L 11/1829 320/109 |
| 2013/0037339 A1* | 2/2013 | Hickox | B60L 11/182 180/167 |
| 2014/0074352 A1* | 3/2014 | Tate, Jr. | B62D 15/028 701/36 |
| 2016/0046198 A1* | 2/2016 | Krammer | B62D 15/025 701/22 |
| 2016/0265919 A1* | 9/2016 | Schuller | G01C 21/165 |

FOREIGN PATENT DOCUMENTS

| | | | | |
|---|---|---|---|---|
| CN | 202764825 | U | | 3/2013 |
| DE | 102013207906 | | * | 10/2014 |
| FR | 2936996 | A1 | * | 4/2010 |
| JP | 10-244890 | A | | 9/1998 |
| JP | 2006-192987 | A | | 7/2006 |
| JP | 2006306241 | A | * | 11/2006 |
| JP | 2006327498 | A | * | 12/2006 |
| JP | 2007-097345 | A | | 4/2007 |
| JP | 2009-294943 | A | | 12/2009 |
| JP | 2010-226945 | A | | 10/2010 |
| JP | 2011-015549 | A | | 1/2011 |
| JP | 2011106216 | A | * | 6/2011 |
| JP | 2011-160515 | A | | 8/2011 |
| JP | 2011-188679 | A | | 9/2011 |
| JP | 2012-005243 | A | | 1/2012 |
| JP | 2012-175764 | A | | 9/2012 |
| JP | 2013-115877 | A | | 6/2013 |
| JP | 2013-153564 | A | | 8/2013 |
| WO | WO 2010/098397 | A1 | * | 9/2010 .......... B60L 11/1816 |
| WO | 2011/132271 | A1 | | 10/2011 |
| WO | WO 2014/177413 | A1 | * | 11/2014 |

OTHER PUBLICATIONS

Google Translation of WO 2014/177413 (original WO application filed Apr. 22, 2014 and published Nov. 6, 2014).*
Japanese Office Action with English concise explanation, Japanese Patent Application No. 2012-057821, Sep. 15, 2015, 7 pgs.
International Search Report, PCT/JP2013/065193, Aug. 27, 2013, 2 pgs.

* cited by examiner

VEHICLE POWER-SUPPLYING SYSTEM

This application is a continuation application based on a PCT Patent Application No. PCT/JP2013/065193, filed on May 31, 2013. The content of the PCT application is incorporated herein by reference.

TECHNICAL FIELD

The present disclosure relates to a vehicle power-supplying system.

BACKGROUND ART

The following Patent Document 1 discloses a parking support apparatus configured to suppress a positional deviation between a power transmission unit (a power-supplying coil) fixed to a road surface and a power reception unit (a power-receiving coil) installed at a vehicle bottom surface. That is, the parking support apparatus recognizes a position of the power transmission unit by an image in the vicinity of a vehicle photographed by a camera to guide the vehicle toward the power transmission unit, and guides the vehicle based on electric power received by the power reception unit.

CITATION LIST

Patent Document

[Patent Document 1] Japanese Unexamined Patent Application, First Publication No. 2011-188679

SUMMARY

Technical Problem

In the parking support apparatus disclosed in Patent Document 1, for example, when the apparatus is applied to suppress a positional deviation between the power-supplying coil disposed in a column in a stop area such as an intersection or the like and the power-receiving coil of the vehicle, the road surface at which the power-supplying coil is installed is in the shadow of a vehicle in front, and the power-supplying coil may not be recognized by the camera. In particular, when a distance to the vehicle in front is short, it is difficult to photograph the power-supplying coil.

In consideration of the above-mentioned circumstances, the present disclosure is directed to appropriately detect a position of a power-supplying coil to suppress a positional deviation between the power-supplying coil of the ground and a power-receiving coil of a vehicle.

Solution to Problem

In order to achieve the above, a first aspect according to the present disclosure relates to a vehicle power-supplying system that wirelessly supply power to a vehicle, the vehicle power-supplying system including a power-supplying means installed at a location at which the vehicle is able to stop; at least one positioning mark whose positional relationship with the power-supplying means is fixed; a position-identifying means installed in the vehicle and configured to identify a positional relationship of the power-supplying means with the vehicle by detecting the positioning mark; and a traveling support means configured to support traveling of the vehicle to the power-supplying means based on the positional relationship of the power-supplying means identified by the position-identifying means.

In a second aspect according to the present disclosure, the location at which the vehicle is able to stop is a rectangular location, and one of the positioning marks is installed behind an vehicle entrance set to one of a pair of short sides of the rectangular location and one of the positioning marks is installed at one of a pair of long sides of the rectangular location.

In a third aspect according to the present disclosure, the position-identifying means identifies, as the positional relationship of the power-supplying means, distance data in two perpendicular axial directions including a widthwise direction and a lengthwise direction in plan view of the vehicle.

In a fourth aspect according to the present disclosure, the position-identifying means photographs a peripheral image of the vehicle using a camera, and identifies the positional relationship of the power-supplying means based on the peripheral image.

In a fifth aspect according to the present disclosure, the traveling support means displays a driving support image showing the positional relationship of the power-supplying means on a display unit.

Effects of Disclosure

According to the present disclosure, since a positional relationship of the power-supplying means with the vehicle is identified using the positioning mark, the position of the power-supplying means can be appropriately detected to suppress a positional deviation between the power-supplying means and the power-receiving means of the vehicle.

DESCRIPTION OF EMBODIMENT

Hereinafter, an embodiment of the present disclosure will be described with reference to the accompanying drawings.

Figure 1A:
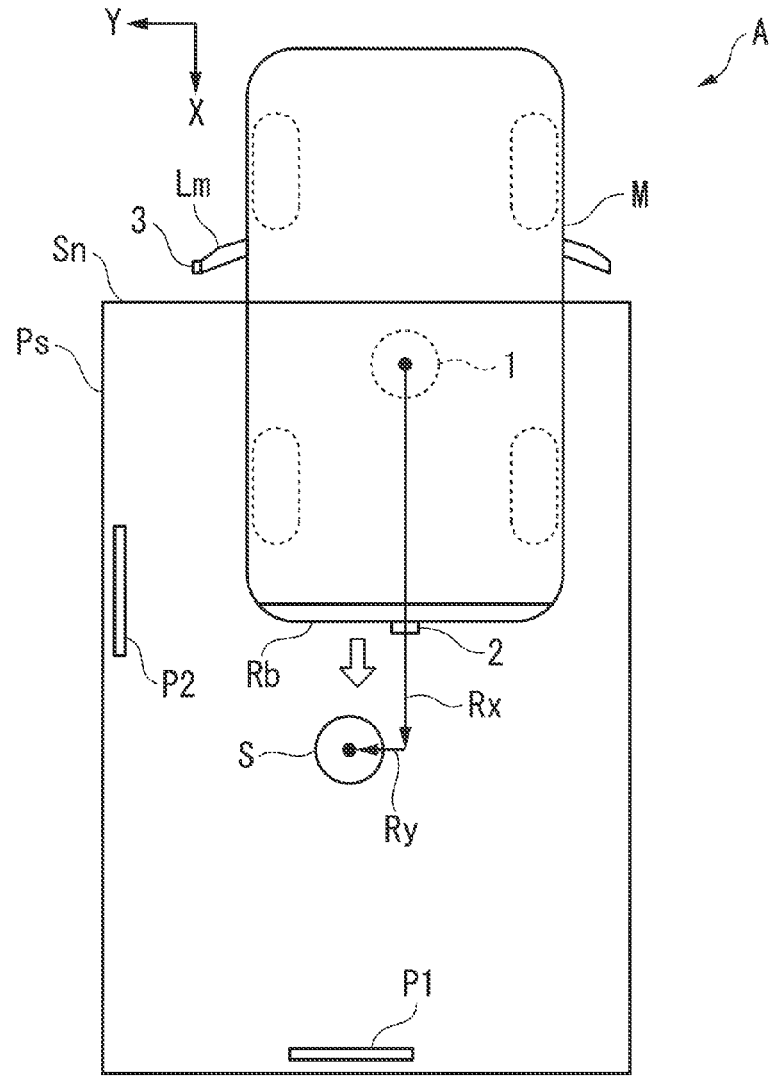
FIG. 1A is a schematic view showing a positional relationship of components of a vehicle power-supplying system, and first and second positioning posts according to an embodiment of the present disclosure.

As shown in FIG. 1A, a vehicle power-supplying system A according to the embodiment is constituted by a power-supplying coil S installed in a parking space Ps, a first positioning post P1 and a second positioning post P2, and a vehicle M that enters and exits the parking space Ps. The above-mentioned vehicle power-supplying system A supplies electric power (power-supplying) to the vehicle M parked in the parking space Ps via the power-supplying coil S in a wireless manner. Further, the power-supplying coil S constitutes a power-supplying means in the embodiment together with a power-supplying circuit (not shown).

Figure 2:
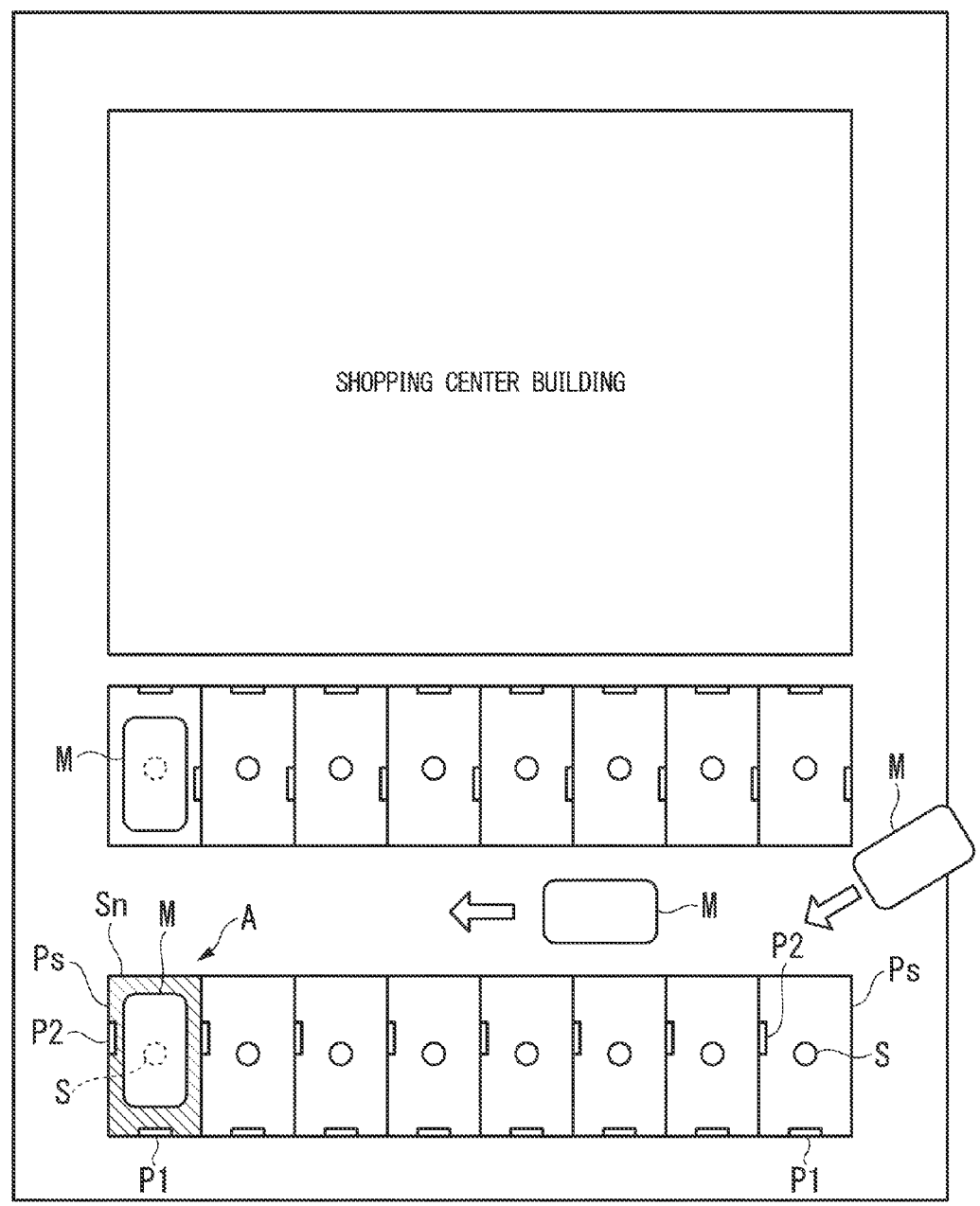
FIG. 2 is a schematic view showing an installation example of the vehicle power-supplying system according to the embodiment of the present disclosure.

As shown in FIG. 2, for example, parking spaces Ps are a plurality of rectangular regions installed in a parking lot of a shopping center, and each has an area in which one vehicle M can be parked. As shown in FIGS. 1A and 2, in the parking space Ps, one of a pair of short sides is set as an entrance Sn (an exit) of the vehicle M. The vehicle M enters the parking space Ps through the entrance Sn (the exit), and exits the parking space Ps through the entrance Sn (the exit).

The power-supplying coil S is a solenoid type coil having a predetermined coil shape and dimension, and installed at a center of a ground surface of the parking space Ps. In addition, the power-supplying coil S emits a magnetic field (a power-supplying magnetic field) to a periphery thereof as alternating current electric power having a predetermined frequency is supplied from the power-supplying circuit. The above-mentioned power-supplying coil S is embedded in the parking space Ps in a posture in which a coil axis is disposed in upward and downward direction (a vertical direction) and in a state in which the coil is exposed to the parking space Ps or in a state of being molded by a non-magnetic material such as plastic or the like so that the power-supplying magnetic field is applied to the vehicle M.

Figure 1B:
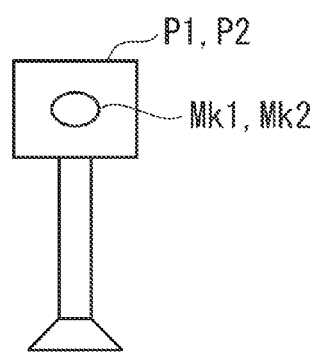
FIG. 1B is a side view of the first and second positioning posts.

As shown in FIG. 1B, the first positioning post P1 is installed behind (in the vicinity of the other short side) the entrance Sn (the exit) in the parking space Ps, and includes a positioning mark Mk1. That is, a positional relationship between the first positioning post P1 and the power-supplying coil S is fixed. As shown in FIG. 1B, the second positioning post P2 is installed at one of a pair of long sides in the parking space Ps, i.e., in the vicinity of the center of the left long side, and includes a positioning mark Mk2. That is, a positional relationship between the second positioning post P2 and the power-supplying coil S is also fixed.

The positioning marks Mk1 and Mk2 of the first and second positioning posts P1 and P2 have unique patterns that do not exist around the parking space Ps. Further, the positioning marks Mk1 and Mk2 may be identical or may be different from each other.

Figure 3:
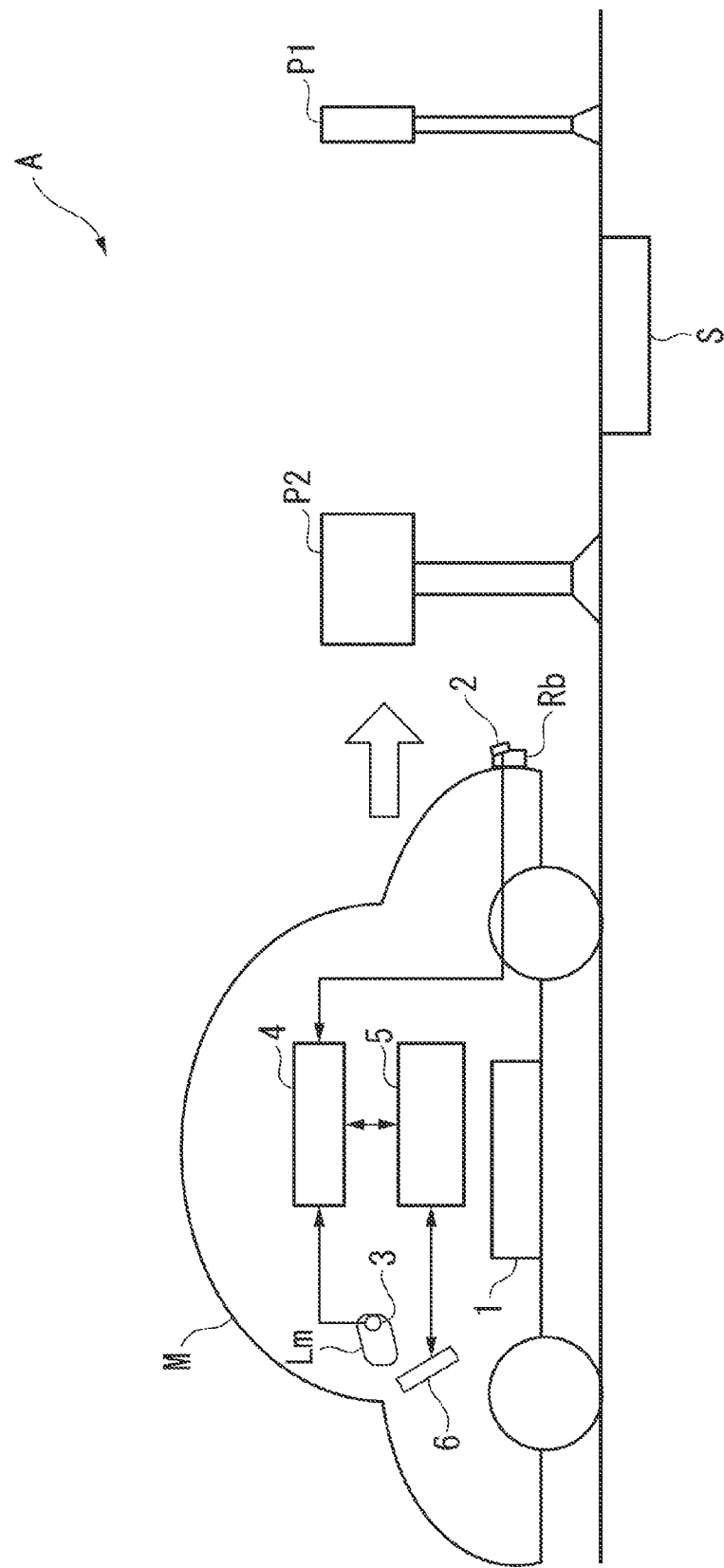
FIG. 3 is a block diagram showing a specific configuration of a main part of the vehicle power-supplying system according to the embodiment of the present disclosure.

The vehicle M is an automobile driven by a driver to travel on a road, and for example, is an electric automobile or a hybrid automobile that travels using electric power as a power source. As shown in FIG. 3, the vehicle M includes a power-receiving coil 1, a first camera 2, a second camera 3, a position calculation unit 4, a support-image generating unit 5 and a touch panel 6. In the above-mentioned components, the first camera 2, the second camera 3 and the position calculation unit 4 constitute a position-identifying means in the embodiment, and the support-image generating unit 5 and the touch panel 6 constitute a traveling support means in the embodiment. Further, while not shown in FIG. 3, of course, the vehicle M includes components needed for traveling, for example, an engine, a fraction motor, a manipulation handle, a brake, a battery (a secondary battery), and so on.

The power-receiving coil 1 is installed at a bottom section of the vehicle M in a posture in which the coil axis is disposed in the upward and downward direction (the vertical direction) to oppose the power-supplying coil S. The power-receiving coil 1 has a coil diameter substantially equal to that of the power-supplying coil S serving as part of the ground facility, and receives alternating current electric power in a wireless manner by electrically coupling to the power-supplying coil S. The above-mentioned power-receiving coil 1 constitutes the power-receiving means in the embodiment together with a charging circuit (not shown). The alternating current electric power (the power-receiving electric power) received by the power-receiving coil 1 is supplied to a driving motor from the power-receiving coil 1 via the charging circuit, or converted into direct current electric power to charge a battery (not shown).

The first camera 2 is installed at a rear section of the vehicle M, and photographs an image (a first peripheral image) of a rear side of the vehicle M to output the image to the position calculation unit 4. For example, the first camera 2 is installed at a central section of a rear bumper Rb of the vehicle M in an upwardly inclined direction so that the first positioning post P1 is photographed in a first peripheral image when the vehicle M backs up and enters the parking space Ps.

The second camera 3 is installed at a left section of the vehicle M, and photographs an image (a second peripheral image) of a left side of the vehicle M to output the image to the position calculation unit 4. For example, the second camera 3 is installed at the edge of a left side mirror Lm so that the second positioning post P2 is photographed in a second peripheral image when the vehicle M backs up and enters the parking space Ps.

The position calculation unit 4 is a software type calculation device that functions based on a predetermined position calculation program, and calculates a relative position R (a positional relationship) of the power-supplying coil S with the vehicle M (the power-receiving coil 1) based on a first peripheral image input from the first camera 2, a second peripheral image input from the second camera 3 and a pre-stored relative position table. The relative position table is a data table in which a relationship between positions of the first and second positioning posts P1 and P2 (more specifically, positions of the positioning marks Mk1 and Mk2) in the first and second peripheral images and the relative position R of the power-supplying coil S with the vehicle M (the power-receiving coil 1) is stored.

The position calculation unit 4 identifies the relative position R of the power-supplying coil S with the vehicle M (the power-receiving coil 1) according to the positions of the first and second positioning posts P1 and P2 (the positions of the positioning marks Mk1 and Mk2) by searching the relative position table based on the positions of the first and second positioning posts P1 and P2 (the positions of the positioning marks Mk1 and Mk2) in the first and second peripheral images, and outputs the relative position R to the support-image generating unit 5. The relative position R shows the position of the power-supplying coil S centering on the power-receiving coil 1 of the vehicle M as a 2-dimensional distance data on the parking space Ps. That is, as shown in FIG. 1A, the relative position R is constituted by two distance data values of a distance (an X-axis distance Rx) in a lengthwise direction (an X-axis direction) of the vehicle M having a rectangular shape in plan view and a distance (a Y-axis distance Ry) of a widthwise direction (a Y-axis direction) of the vehicle M.

The support-image generating unit 5 is a software type control device that functions based on a predetermined vehicle control program, and instructs acquisition processing of the relative position R to the position calculation unit 4 based on a manipulation instruction signal input from the touch panel 6. In addition, the support-image generating unit 5 generates a driving support image that supports a driver to face the power-receiving coil 1 of the vehicle M with the power-supplying coil S based on the relative position R input from the position calculation unit 4, and outputs the image signal (the support image signal) that shows the driving support image to the touch panel 6. For example, the driving support image shows that the relative position R varies according to the traveling of the vehicle M in plan view centering on the vehicle M.

Here, while the position calculation unit 4 and the support-image generating unit 5 are shown as having different functional components in FIG. 3, the position calculation unit 4 and the support-image generating unit 5 are equal to each other in a hardware system. That is, the position calculation unit 4 and the support-image generating unit 5 are computers each constituted by hardware elements such as a central processing unit (CPU), a read only memory (ROM), a random access memory (RAM), and so on, and the CPU realizes the above-mentioned functions by executing the position calculation program or the vehicle control program stored in the ROM. Processing of the above-mentioned support-image generating unit 5 will be described below in the following description of the operation in detail.

The touch panel 6 is, for example, a manipulation panel-attached liquid crystal display attached to the vicinity of a manipulation handle, and receives a manipulation instruction of a driver to output the instruction to the support-image generating unit 5 as a manipulation instruction signal while displaying the driving support image based on the support image signal input from the support-image generating unit 5.

Figure 4:
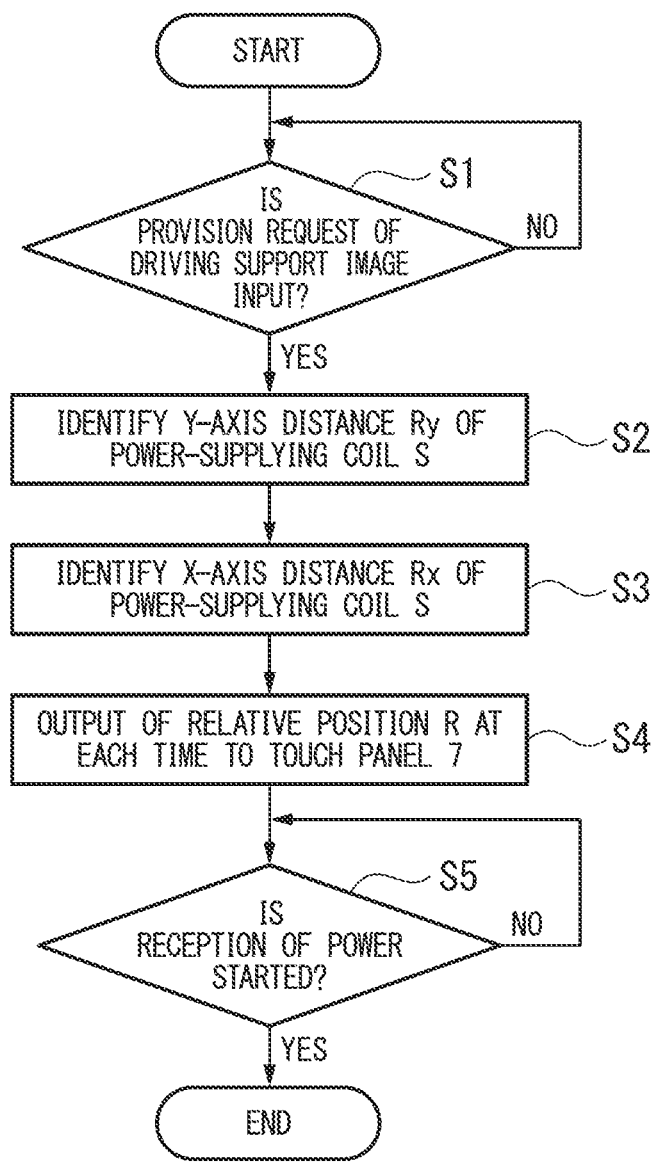
FIG. 4 is a flowchart showing an operation of the vehicle power-supplying system according to the embodiment of the present disclosure.

Next, the operation of the vehicle power-supplying system A configured as described above will be described with reference to the flow chart of FIG. 4.

For example, a driver of the vehicle M backs up the vehicle M to enter the parking space Ps from the entrance Sn (the exit) when the vehicle M is to be parked. The driver manipulates the touch panel 6 to request the provision of the driving support image. When the provision request of the above-mentioned driving support image is input from the touch panel 6 (step S1), the support-image generating unit 5 instructs an acquisition start of the relative position R of the power-supplying coil S to the position calculation unit 4. On the other hand, the judgment processing of step S1 is repeatedly in standby when the provision request is not input. Further, the driver performs the provision request when a charging remainder of the battery mounted in the vehicle M becomes small enough to require power to be supplied from the outside, and so on.

When an acquisition start instruction of the relative position R is input from the support-image generating unit 5, the position calculation unit 4 identifies a position of the first positioning post P1 (a position of the positioning mark Mk1) in the first peripheral image as predetermined image processing is performed on the first peripheral image input from the first camera 2, and further identifies a distance in the Y-axis direction (the Y-axis distance Ry) of the power-supplying coil S with respect to the vehicle M (the power-receiving coil 1) by searching the relative position table using a position of the identified first positioning post P1 (a position of the positioning mark Mk1) (step S2).

The first peripheral image photographed by the first camera 2 fixed to the vehicle M includes the first positioning post P1 when the rear section of the vehicle M approaches a state facing the first positioning post P1. That is, when the vehicle M is inclined at a predetermined angle or more with respect to the parking space Ps, the first positioning post P1 is not shown in the first peripheral image, when an inclination of the vehicle M is less than a predetermined angle, the first peripheral image includes the first positioning post P1. In addition, a position, in the left and right direction, of the first positioning post P1 (the positioning mark Mk1) in the first peripheral image is varied according to the position of the vehicle M in a widthwise direction of the parking space Ps. The Y-axis distance Ry is determined by the position, in the left and right direction, of the first positioning post P1 (the positioning mark Mk1) in the first peripheral image.

Further, the position calculation unit 4 identifies the position of the second positioning post P2 (the position of the positioning mark Mk2) in the second peripheral image as predetermined image processing is performed on the second peripheral image input from the second camera 3, and identifies the distance in the X-axis direction (the X-axis distance Rx) of the power-supplying coil S with respect to the vehicle M (the power-receiving coil 1) as the relative position table is searched using the position of the identified second positioning post P2 (the position of the positioning mark Mk2) (step S3).

The second peripheral image photographed by the second camera 3 fixed to the vehicle M includes the second positioning post P2 when the left side mirror Lm of the vehicle M approaches a state facing the second positioning post P2. That is, when the vehicle M is inclined at a predetermined angle or more with respect to the parking space Ps or when the second positioning post P2 and the second camera 3 of the vehicle M are spaced a predetermined distance or more from each other in the lengthwise direction of the parking space Ps while the vehicle M is not inclined, the second positioning post P2 is not shown in the second peripheral image. However, when the inclination of the vehicle M is less than the predetermined angle and the distance between the second positioning post P2 and the second camera 3 of the vehicle M is less than the predetermined distance, the second peripheral image includes the second positioning post P2. In addition, the position, in the left and right direction, of the second positioning post P2 (the positioning mark Mk2) in the second peripheral image is varied according to the position of the vehicle M in the lengthwise direction of the parking space Ps. The X-axis distance Rx is determined by the position, in the left and right direction, of the second positioning post P2 (the positioning mark Mk2) in the second peripheral image.

The position calculation unit 4 outputs an initial value of the relative position R constituted by the Y-axis distance Ry and the X-axis distance Rx of the power-supplying coil S acquired as described above to the support-image generating unit 5. As a result, the support-image generating unit 5 generates a driving support image showing the initial value input from the position calculation unit 4 to output the driving support image to the touch panel 6 as a support image signal. The initial value of the relative position R obtained in this way is a position of the power-supplying coil S immediately after the acquisition start of the relative position R of the power-supplying coil S. Since the vehicle M is moved by driving of the driver, the relative position R is sequentially varied every moment from the initial value according to the position of the vehicle M.

The position calculation unit 4 repeats steps S2 and S3 at a predetermined time interval to output the relative position R of the power-supplying coil S to the support-image generating unit 5. The support-image generating unit 5 sequentially generates the driving support image showing the relative position R at every moment input from the position calculation unit 4 to output the driving support image to the touch panel 6 as the support image signal (step S4). As a result, the relative position R sequentially varied subsequent to the initial value is sequentially displayed on the touch panel 6 in plan view about the vehicle M in chronological order.

The driver of the vehicle M stops the vehicle M so that the power-receiving coil 1 and the power-supplying coil S face each other as the driving operation of the vehicle M is performed with reference to the above-mentioned driving support image.

The power-supplying circuit (not shown) starts the output of the alternating current electric power to the power-supplying coil S when it is detected that the power-receiving coil 1 is magnetically coupled to the power-supplying coil S, and thus, power-supplying to the vehicle M is started. The support-image generating unit 5 of the vehicle M determines whether the power-receiving coil 1 receives the electric power from the power-supplying coil S (step S5), and when the judgment is "Yes," the entire processing is terminated.

In this way, the power-supplying to the vehicle M from the power-supplying coil S serving as part of a ground facility is terminated as the vehicle M moves from the parking space Ps. That is, the power-supplying circuit terminates supply of the electric power to the power-supplying coil S when the magnetic coupling of the power-receiving coil 1 to the power-supplying coil S is released as the vehicle M starts to travel.

According to the above-mentioned embodiment, since the relative position R of the power-supplying coil S with the vehicle M is acquired using the first and second positioning posts P1 and P2, the position of the power-supplying coil S can be appropriately detected to suppress the positional deviation between the power-supplying coil S and the power-receiving coil 1 of the vehicle M.

Hereinabove, while the embodiment of the present disclosure has been described, the present disclosure is not limited to the embodiment and, for example, the following modifications may be considered.

(1) In the embodiment, although the acquisition of the relative position R of the power-supplying coil S is started based on the manipulation instruction of the driver, the present disclosure is not limited thereto. For example, the support-image generating unit 5 pre-stores the installation positions of the first and second positioning posts P1 and P2 on a map, a present location of the vehicle M is recognized based on a signal of a global positioning system (GPS) signal or information by another system in a wireless manner, and when the vehicle M approaches the first and second positioning posts P1 and P2, acquisition of the relative position R of the power-supplying coil S may be automatically started.

(2) In addition, without starting the acquisition of the relative position R of the power-supplying coil S based on the manipulation instruction of the driver, the acquisition of the relative position R of the power-supplying coil S may automatically start when the first camera 2 photographs the position of the first positioning post P1 (the positioning mark Mk1) or the second camera 3 photographs the second positioning post P2 (the positioning mark Mk2).

(3) In the embodiment, although the second positioning post P2 is installed in the vicinity of the center of the left long side of the parking space Ps, the present disclosure is not limited thereto. For example, the second positioning post P2 may be installed in the vicinity of the center of the right long side of the parking space Ps instead in the vicinity of the center of the left long side of the parking space Ps. The second camera 3 should be installed at the right side mirror of the vehicle M. In addition, in the embodiment, while the first and second positioning posts P1 and P2 are installed, the number is not limited to two. For example, the second positioning post P2 may be installed at both of the left and right long sides of the parking space Ps, and the plurality of first positioning posts P1 may be installed behind the entrance Sn (the exit) of the parking space Ps.

(4) In the embodiment, although the first camera 2 is installed at the rear bumper Rb of the vehicle M so that the photographing range is fixed and the second camera 3 is installed at the front end of the left side mirror Lm so that the photographing range is fixed, the present disclosure is not limited thereto. For example, the first and second peripheral images may be photographed as one camera is installed at an upper section or the like of the vehicle M and a photographing angle of view of the camera is varied through automatic control. That is, as long as the first and second peripheral images in which the first and second positioning posts P1 and P2 installed at the parking space Ps are included can be photographed, the number of the cameras is not limited.

(5) In the embodiment, although the relative position R of the power-supplying coil S is acquired by photographing the first and second peripheral images including the first and second positioning posts P1 and P2 using the first and second cameras 2 and 3, the present disclosure is not limited thereto. For example, a laser sensor may be employed instead of the first and second cameras 2 and 3, and the relative position R of the power-supplying coil S may be acquired based on detection results of the first and second positioning posts P1 and P2 using the laser sensor.

(6) In the embodiment, although the relative position R of the power-supplying coil S is displayed on the touch panel 6 in plan view about the vehicle M, the present disclosure is not limited thereto. Instead of the plan view showing the relative position R of the power-supplying coil S, for example, the 2-dimensional distance data showing the relative position R of the power-supplying coil S may be displayed as character information. That is, the support information based on the relative position R of the power-supplying coil S may be information that supports an operation until the power-receiving coil 1 faces the power-supplying coil S.

(7) In the embodiment, although the relative position R of the power-supplying coil S is displayed on the touch panel 6, the present disclosure is not limited thereto. For example, a speaker may be installed in the vehicle M, and the driver may be notified of the relative position R of the power-supplying coil S with sound using the speaker.

(8) In the embodiment, although the parking lot of the shopping center schematically shown in FIG. 2 has been described as an example of a location at which the vehicle M can be parked, the present disclosure is not limited thereto. As the parking lot including the power-supplying coil S serving as part of the ground facility of the vehicle power-supplying system A, the power-supplying circuit (not shown), the first and second positioning posts P1 and P2, and so on, either a public or private parking lot may be provided. In addition, the location at which the vehicle M can be stopped may be a drive-through site in a store or the like rather than the parking lot, or a stop site or the like such as a gas station when the vehicle M is a hybrid automobile.

INDUSTRIAL APPLICABILITY

According to the present disclosure, since the positional relationship of the power-supplying means with the vehicle is identified using the positioning mark, the position of the power-supplying means can be appropriately detected to suppress the positional deviation between the power-supplying means and the power-receiving means of the vehicle.

The invention claimed is:

1. A vehicle power-supplying system that wirelessly supplies power to a vehicle including a power-receiving coil, the vehicle power-supplying system comprising:
   a power-supplying coil installed at a location at which the vehicle is able to stop;
   at least two positioning marks with unique patterns whose positional relationship with the power-supplying coil is fixed;
   a position-identifying means installed in the vehicle and configured to identify a positional relationship of the power-supplying coil with the vehicle by detecting the positioning mark; and
   a control device configured to support positioning the vehicle to the power-supplying coil based on the positional relationship of the power-supplying coil identified by the position-identifying means,
   wherein
   the location at which the vehicle is able to stop is a rectangular location,
   a first position mark of the at least two positioning marks is installed in the vicinity of the other short side of a vehicle entrance set to one of a pair of short sides of the rectangular location and a second position mark of the at least two positioning marks is installed at one of a pair of long sides of the rectangular location,
   the position-identifying means includes: a first camera or a first laser sensor installed at a rear or front section of the vehicle; and a second camera or a second laser sensor installed at a left and/or right section of the vehicle,
   the control device includes a central processing unit (CPU) and controls a touch panel and a speaker to support the positioning of the vehicle to the power-supplying coil by images and sounds, and
   when the power-supplying coil and the power-receiving coil face each other, the first camera or the first laser sensor, and the second camera or the second laser sensor detect the first and second positioning marks.

2. The vehicle power-supplying system according to claim 1, wherein the position-identifying means identifies, as the positional relationship of the power-supplying coil, distance data in two perpendicular axial directions including a widthwise direction and a lengthwise direction in plan view of the vehicle.

3. The vehicle power-supplying system according to claim 2, wherein the position-identifying means photographs a peripheral image of the vehicle using a camera, and identifies the positional relationship of the power-supplying coil based on the peripheral image.

4. The vehicle power-supplying system according to claim 3, wherein the control device displays a driving support image showing the positional relationship of the power-supplying coil on a display unit.

5. The vehicle power-supplying system according to claim 2, wherein the control device displays a driving support image showing the positional relationship of the power-supplying coil on a display unit.

6. The vehicle power-supplying system according to claim 1, wherein the position-identifying means identifies, as the positional relationship of the power-supplying coil, distance data in two perpendicular axial directions including the widthwise direction and the lengthwise direction in plan view of the vehicle.

7. The vehicle power-supplying system according to claim 6, wherein the control device displays a driving support image showing the positional relationship of the power-supplying coil on a display unit.

8. The vehicle power-supplying system according to claim 1, wherein the position-identifying means photographs a peripheral image of the vehicle using a camera, and identifies the positional relationship of the power-supplying coil based on the peripheral image.

9. The vehicle power-supplying system according to claim 8, wherein the control device displays a driving support image showing the positional relationship of the power-supplying coil on a display unit.

10. The vehicle power-supplying system according to claim 1, wherein the position-identifying means photographs a peripheral image of the vehicle using a camera, and identifies the positional relationship of the power-supplying coil based on the peripheral image.

11. The vehicle power-supplying system according to claim 10, wherein the control device displays a driving support image showing the positional relationship of the power-supplying coil on a display unit.

12. The vehicle power-supplying system according to claim 1, wherein the control device displays a driving support image showing the positional relationship of the power-supplying coil on a display unit.

13. The vehicle power-supplying system according to claim 1, wherein the control device displays a driving support image showing the positional relationship of the power-supplying coil on a display unit.

14. The vehicle power-supplying system according to claim 1, wherein
   the second camera or the second laser sensor is installed at either one of the left or right section of the vehicle.

15. The vehicle power-supplying system according to claim 1, wherein
   the position-identifying means calculates a relative position of the power-supplying coil with the vehicle based on a first peripheral image input from the first camera, a second peripheral image input from the second camera and a pre-stored relative position table.

16. A vehicle including a power-receiving coil that wirelessly receives power from a power-supplying coil, the vehicle comprising:
   a position-identifying means installed in the vehicle and configured to identify a positional relationship of the power-supplying coil with the vehicle by detecting two positioning marks with unique patterns; and
   a control device configured to support traveling of the vehicle to the power-supplying coil based on the positional relationship of the power-supplying coil identified by the position-identifying means, wherein
   the position-identifying means includes: a first camera or a first laser sensor installed at a rear or front section of the vehicle; and a second camera or a second laser sensor installed at a left or right section of the vehicle,
   the control device includes a central processing unit (CPU) and controls a touch panel and a speaker to support the positioning of the vehicle to the power-supplying coil by images and sounds, and
   when the power-supplying coil and the power-receiving coil face each other, the first camera or the first laser sensor, and the second camera or the second laser sensor detect the two positioning marks.

* * * * *